US006973591B2

(12) United States Patent  (10) Patent No.: US 6,973,591 B2
Debling  (45) Date of Patent: Dec. 6, 2005

(54) ON-CHIP EMULATOR COMMUNICATION FOR DEBUGGING

(75) Inventor: Anthony Debling, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 526 days.

(21) Appl. No.: 09/981,624

(22) Filed: Oct. 16, 2001

(65) Prior Publication Data

US 2002/0059542 A1  May 16, 2002

(30) Foreign Application Priority Data

Oct. 18, 2000  (GB) .................................... 0025594

(51) Int. Cl.⁷ ............................................ G06F 11/00
(52) U.S. Cl. ............................. 714/30; 714/27; 703/28
(58) Field of Search .......................... 714/28, 30, 27, 714/29; 703/20, 28; 712/227

(56) References Cited

U.S. PATENT DOCUMENTS

| | | |
|---|---|---|
| 4,860,290 A | 8/1989 | Daniels et al. |
| 5,173,904 A | 12/1992 | Daniels et al. |
| 5,329,471 A | 7/1994 | Swoboda et al. |
| 5,535,331 A | 7/1996 | Swoboda et al. |
| 5,684,721 A | 11/1997 | Swoboda et al. |
| 5,911,059 A * | 6/1999 | Profit, Jr. ..................... 703/23 |
| 5,995,744 A | 11/1999 | Guccione |
| 6,032,268 A | 2/2000 | Swoboda et al. |
| 6,085,336 A | 7/2000 | Swoboda et al. |

(Continued)

FOREIGN PATENT DOCUMENTS

DE  EP001058189 A2 *  6/2000

(Continued)

OTHER PUBLICATIONS

U.S. Appl. No. 60/219,340.*

(Continued)

Primary Examiner—Robert Beausoliel
Assistant Examiner—Christopher McCarthy
(74) Attorney, Agent, or Firm—Lisa K. Jorgenson; James H. Morris; Wolf, Greenfield & Sacks, P.C.

(57) ABSTRACT

A debugging system comprising a host computer system and a target device, said target device having an embedded digital processor on an integrated circuit chip, an on-chip emulation device coupled to said digital processor, the on-chip emulation device being operable to control said digital processor and to collect information about the operation of said digital processor, the on-chip emulation device having a communication port operable to receive information from and emit information to the host computer system wherein said debugging system further comprises an interface on said integrated circuit chip having a first port connected to said communication port of said on-chip emulation device and a second port connected to a universal serial bus, said host computer system having a universal serial bus port connected to said universal serial bus wherein said host computer system comprises a proxy server program for managing the universal serial bus port to enable communication over said universal serial bus, and said host computer further comprises application software in use communicating with the proxy server program and hence via said universal serial bus, with the or each digital processor.

4 Claims, 2 Drawing Sheets

U.S. PATENT DOCUMENTS

| | | | | |
|---|---|---|---|---|
| 6,311,292 | B1 * | 10/2001 | Choquette et al. | 714/30 |
| 6,516,428 | B2 * | 2/2003 | Wenzel et al. | 714/28 |
| 6,647,511 | B1 * | 11/2003 | Swoboda et al. | 714/30 |
| 6,691,251 | B2 * | 2/2004 | Wong | 714/28 |
| 6,732,311 | B1 * | 5/2004 | Fischer et al. | 714/737 |
| 2001/0039633 | A1 * | 11/2001 | Swoboda et al. | 714/28 |
| 2001/0056555 | A1 * | 12/2001 | Deao et al. | 714/28 |
| 2002/0059541 | A1 * | 5/2002 | Swoboda | 714/28 |

FOREIGN PATENT DOCUMENTS

| | | |
|---|---|---|
| WO | WO 98 09208 A | 3/1998 |
| WO | WO 00 57587 A | 9/2000 |

OTHER PUBLICATIONS

Standard Search Report from British application No. 0025591, filed Oct. 18, 2001.

Standard Search Report from RS 105934.

* cited by examiner

ON-CHIP EMULATOR COMMUNICATION FOR DEBUGGING

FIELD OF THE INVENTION

The present invention relates to a debugging system for an embedded digital processor on a single integrated circuit chip, the chip comprising an on-chip emulation device.

BACKGROUND TO THE INVENTION

A first technique for debugging involves the use of a hardware emulator—software simulating the device being debugged, and running on the host. Although these may run in real time, they only provide limited functionality, and are generally undesirable.

Another technique for debugging embedded digital processors include the use of so-called "on-chip emulator" whose function is to monitor and control the operation of the digital signal processor. Such devices typically have storage capability, and the ability to initiate command and control sequences for the digital processor in response to externally applied signals from a host computer or to detected states of the digital processor.

Communication between the on-chip emulator and the host computer is carried out via a link, which is typically a link designed for the particular situation. As a result, signals over the link are tailored to the particular on-chip emulation device in the interests of efficient debugging.

It is an object of the present invention to at least partially mitigate the difficulties of the prior art.

SUMMARY OF THE INVENTION

According to a first aspect of the present invention there is provided a debugging system comprising a host computer system and a target device, said target device having an embedded digital processor on an integrated circuit chip, an on-chip emulation device coupled to said digital processor, the on-chip emulation device being operable to control said digital processor and to collect information about the operation of said digital processor, the on-chip emulation device having a communication port operable to receive information from and emit information to the host computer system wherein said debugging system further comprises an interface on said integrated circuit chip having a first port connected to said communication port of said on-chip emulation device and a second port connected to a universal serial bus, said host computer system having a universal serial bus port connected to said universal serial bus.

According to a second aspect of the invention there is provided a method of debugging an integrated circuit chip by communicating between application programs running on a host computer system and a device on said integrated circuit chip, the chip comprising digital processing circuitry and on-chip emulation circuitry for communicating with and control of said digital processing circuitry, the on-chip emulation circuitry having a communications port for receiving information from said host computer system and for passing information to said host computer system, the integrated circuit chip further having an on-chip usb interface connected to a target usb port, and the host computer system having a host usb port, the method comprising: converting said host usb port to said target usb port; running a proxy server program on said host computer system, causing a said application program to connect to said proxy server program, whereby said proxy server program connects to said device on said chip via said host and target usb ports.

According to a further aspect there is provided a method of operating an integrated circuit chip having digital processing circuitry and on-chip emulation circuitry for communicating with, and control of said digital processing circuitry, the on-chip emulation circuitry having a communications port for receiving information from a remote computer system and for passing information to said remote computer system, said integrated circuit chip further having an on-chip usb interface connected to a usb port, the method comprising converting said usb port to the usb port of a host computer, wherein said host computer is capable of Internet connection; running a proxy server process on said host computer; generating a remote procedure call in said chip; transferring said remote procedure call via said usb to said proxy server process; converting said remote procedure call to a socket call; and thereby communicating between said chip and the Internet.

An embodiment of the invention will now be described with reference to the accompanying drawings.

BRIEF DESCRIPTION OF THE DRAWINGS

In the various figures, like reference numerals indicate like parts.

DESCRIPTION OF THE PREFERRED EMBODIMENT

Figure 1:
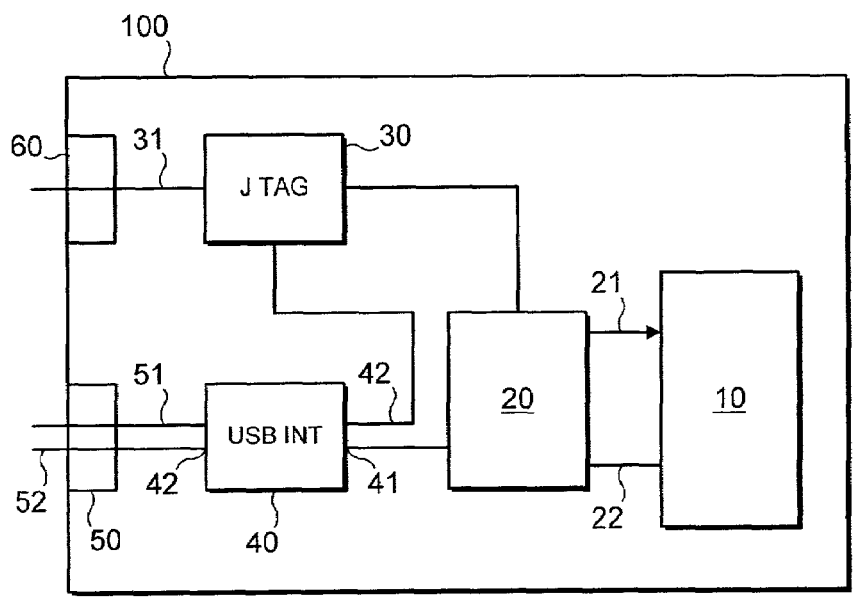
FIG. 1 shows a schematic diagram of an integrated circuit chip having an on-chip emulator device and a USB interface.

Referring first to FIG. 1, an embedded system includes an integrated circuit chip 100 which comprises a processor 10 on said chip. As used herein, the term 'processor' includes microprocessors and digital signal processors. The processor is connected to other component circuitry of said embedded system in a manner known to those skilled in the art.

At least during debugging of said embedded system, it is advantageous to be able to collect information about the operation of the processor and also to supply control and command information to said processor, both in response to conditions on the processor itself, and also in response to information conveyed from a host computer.

For collecting information about operation of the processor and for controlling the processor the integrated circuit chip 100 includes an on-chip emulator comprising storage and processing circuitry for that purpose. Such an on-chip emulator 20 is shown schematically on FIG. 1 as having a control path 21 connected to the processor 10 and having an information-collecting path 22 from the digital signal processor 10.

The on-chip emulator 20 has associated JTAG circuitry 30 connected to it.

To enable ready connection to a host device, the chip further comprises a USB interface circuit 40. The USB interface 40 has a first port 41 connected to the on-chip emulator 20, a second port 42 connected on-chip to a USB port 50 via a universal serial bus 51. The USB interface circuitry also has a further port 42 connected to the JTAG circuitry 30 which in turn has an on-chip connection 31 to a JTAG port 60.

A universal serial bus is, in use, connected to the USB port 50, the universal serial bus 52 connects at its other end to a host device, typically a debugging computer having a USB port.

Debugging may take place using the host device; however by virtue of the USB connection, it may be possible to debug from a more remote location, as will be later described herein.

Figure 2:
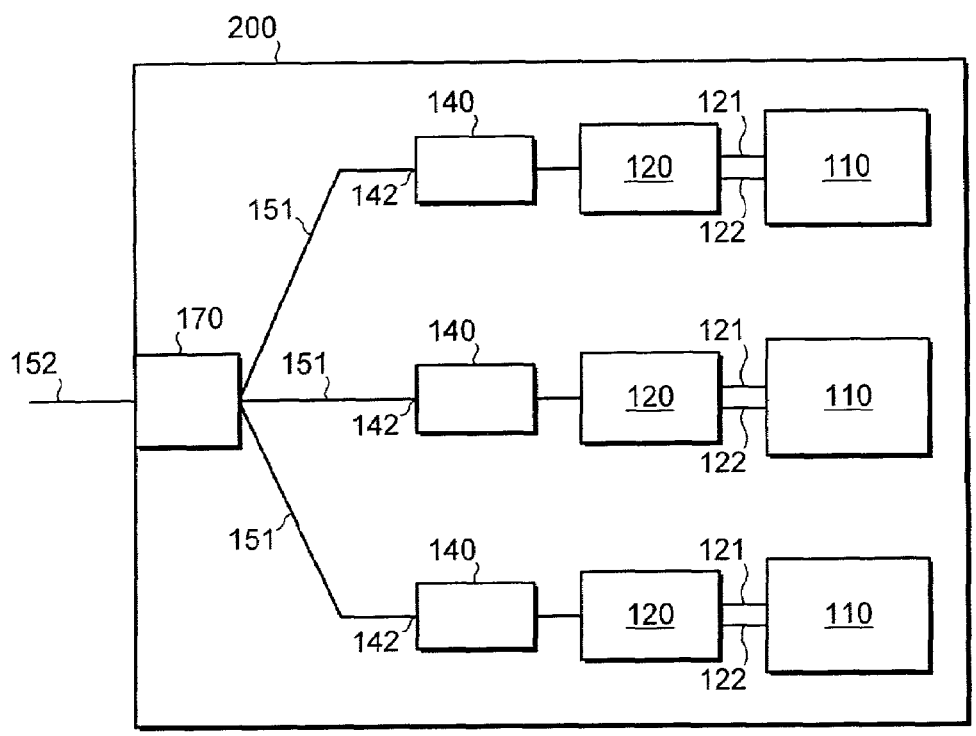
FIG. 2 shows a multiprocessor version of the chip of FIG. 1.

Referring now to FIG. 2, a second integrated circuit chip 200 comprises plural, here 3, embedded processors 110, each having a respective associated on-chip emulator 120 connected to it via a respective control path 121 and information collecting path 122.

Each on-chip emulator 120 is connected to respective USB interface circuitry 140 and each USB interface circuitry 140 has a USB input port 142 to which is connected an on-chip universal serial bus 151 which connects to an on-chip USB hub 170. JTAG circuitry as shown in FIG. 1 may also be provided but is here emitted for the sake of clarity.

The USB hub 170 has an input for a universal serial bus 152, whereby debugging occurs.

The universal serial bus provides the ability to download programs and monitor and control the processor (so-called "peek" and "poke") in combination with a remote or host system. The bus also allows a general bi-directional communication path between the host and target system.

The use of the universal serial bus also enables a route for a host program to configure and control silicon components on a highly integrated device. It enables programming of any on-chip EEPROM and for production programming diagnostics.

During the debugging phase the universal serial bus enables coherent control and graphical representation of the behaviour of systems on silicon with one or more processors.

Connection to the JTAG circuitry allows for JTAG functions to be executed through the USB port although it should be borne in mind that a JTAG port would still be needed to allow connection to other devices. It will be appreciated by those skilled in the art that whereas JTAG functions normally require a special adapter card this would not be the case using embodiments of the present invention.

Use of the universal serial bus allows the multiplexing together of the above-described functions using the bus. A hub would be needed on-chip to enable multiplexing at hardware level. Such a connection is advantageously realized using USB in the 12 Mb/s incarnation since this is in line with Ethernet.

In the state of the art, Ethernet chips may be added at board level.

Figure 3:
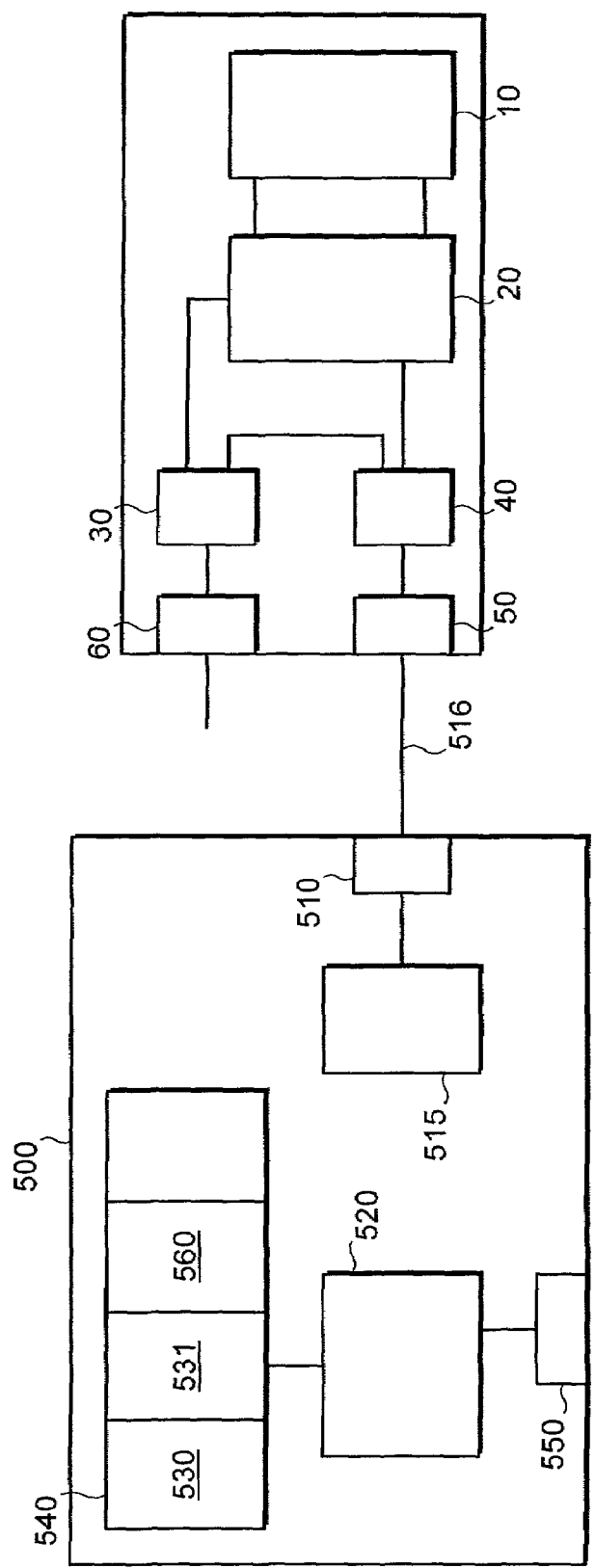
FIG. 3 shows a block schematic diagram of a debugging system in accordance with the present invention.

Referring now to FIG. 3, a system for debugging the target chip 100, described with respect to FIG. 1, will now be described. It will be understood that the chip 200 could be substituted for the chip 100; the essence is that the target chip is accessible via a usb. The system further includes a host device 500 having a usb port 510 connected to the usb port 50 of the target via a usb 516. The host comprises a computer 520 and memory circuitry 540 storing computer program files including applications 510, 531 and a proxy server process 560. As known to those skilled in the art, the program files are loaded for running by the computer. The program files 530, 531 provide the needed features for debugging the target. The host has an external port 550 responsive to the computer 520, and capable of network or Internet connection, e.g. via a modem or otherwise as known to those skilled in the art. A usb driver 515 connects to the host usb port 510.

The host also runs the proxy server process 560. Again, as known to those skilled in the art, a proxy server is a computer or a process running on a computer acting as intermediary between a client and another server or server-type process. In the present context, it is envisaged that functions relating to management of the usb port 510 via the usb driver 515, and functions relating to distribution of various connections from the target chip 100 be delegated to the proxy server process 560 running on the host.

The debugging programs 530, 531 acting as clients, connect to the proxy server 560, which creates the necessary logical connections to the required devices in the target via the usb. Similarly, connections can be made to methods and processes within the target, including program load and debug, configuration, visualisation, EPROM programming, and running diagnostics. The host programs may further implement virtual devices that can be accessed from any processor within a multi-processor target chip.

Viewed from the target side, the target 100 can itself originate calls to the proxy server 560 by sending a package representing a simple remote procedure call over the usb 516 to the proxy server 560. The call data may take only a small amount of memory on the target, e.g. in the on chip emulator. After receipt of the package from the usb driver 515, the proxy server 560 converts the data into a socket call to allow Internet access or other network access using the relevant protocol via a line connected to the external port 550, or otherwise.

What is claimed is:

1. A debugging system comprising a host computer system and a target device, said target device having an embedded digital processor on an integrated circuit chip, an on-chip emulation device, wherein said on-chip emulation device is contained entirely on-chip, coupled to said digital processor, the on-chip emulation device being operable to control said digital processor and to collect information about the operation of said digital processor, the on-chip emulation device having a communication port operable to receive information from and emit information to the host computer system wherein said debugging system further comprises an interface on said integrated circuit chip having a first port connected to said communication port of said on-chip emulation device and a second port connected to a universal serial bus, said host computer system having a universal serial bus port connected to said universal serial bus wherein said host computer system comprises a proxy server program for managing the universal serial bus port to enable communication over said universal serial bus, and said host computer further comprises application software in use communicating with the proxy server program and hence via said universal serial bus, with the embedded digital processor.

2. The system of claim 1 wherein said target device has plural said embedded digital processors of said chip.

3. A method of debugging an integrated circuit chip by communicating between application programs running on a host computer system and a device on said integrated circuit chip, the chip comprising digital processing circuitry and on-chip emulation circuitry, wherein said on-chip emulation circuitry is contained entirely on-chip, for communicating with and control of said digital processing circuitry, the on-chip emulation circuitry having a communications port for receiving information from said host computer system and for passing information to said host computer system, the integrated circuit chip further having an on-chip usb interface connected to a target usb port, and the host computer system having a host usb port, the method comprising: converting said host usb port to said target usb port; running a proxy server program on said host computer system, causing a said application program to connect to said proxy server program, whereby said proxy server program connects to said device on said chip via said host and target usb ports.

4. A method of operating an integrated circuit chip having digital processing circuitry and on-chip emulation circuitry, wherein said on-chip emulation circuitry is contained entirely on-chip, for communicating with, and control of said digital processing circuitry, the on-chip emulation circuitry having a communications port for receiving information from a remote computer system and for passing information to said remote computer system, said integrated circuit chip further having an on-chip usb interface connected to a usb port, the method comprising converting said usb port to the usb port of a host computer, wherein said host computer is capable of Internet connection; running a proxy server process on said host computer; generating a remote procedure call in said chip; transferring said remote procedure call via said usb to said proxy server process; converting said remote procedure call to a socket call; and thereby communicating between said chip and the Internet.

* * * * *